(12) United States Patent
Nadler et al.

(10) Patent No.: US 7,897,828 B2
(45) Date of Patent: Mar. 1, 2011

(54) PROCESS FOR SEPARATING A HEAVY OIL FEEDSTREAM INTO IMPROVED PRODUCTS

(75) Inventors: Kirk C. Nadler, Houston, TX (US);
Daniel P. Leta, Flemington, NJ (US);
Halou Oumar-Mahamat, Belle Mead, NJ (US); Edward W. Corcoran, Easton, PA (US); Stephen H. Brown, Bernardsville, NJ (US); Eric B. Sirota, Flemington, NJ (US); John H. Hollenbach, Vienna, VA (US);
Anjaneya S. Kovvali, Fairfax, VA (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 516 days.

(21) Appl. No.: 11/980,159

(22) Filed: Oct. 30, 2007

(65) Prior Publication Data

US 2009/0062590 A1  Mar. 5, 2009

Related U.S. Application Data

(60) Provisional application No. 60/966,517, filed on Aug. 28, 2007.

(51) Int. Cl.
*C07C 7/144* (2006.01)
(52) U.S. Cl. .................. 585/818; 208/113; 208/130
(58) Field of Classification Search .................. None
See application file for complete search history.

(56) References Cited

U.S. PATENT DOCUMENTS

| | | | |
|---|---|---|---|
| 2,947,687 A | 10/1954 | Lee | |
| 3,684,697 A | 8/1972 | Gamson | |
| 3,919,075 A | 11/1975 | Parc et al. | |
| 3,990,963 A | 11/1976 | Audibert et al. | |
| 4,115,465 A | 9/1978 | Elfert et al. | |
| 4,120,900 A | 10/1978 | Evers et al. | |
| 4,134,824 A | 1/1979 | Kamm et al. | |
| 4,169,782 A | 10/1979 | Thompson | |

(Continued)

FOREIGN PATENT DOCUMENTS

CA  2185264  9/1996

(Continued)

OTHER PUBLICATIONS

V. S. Ravi-Kumar, Theodore T. Tsotsis, Muhammad Sahimi; "Studies of Transport of Asphaltenes through Membranes Using Hindered Diffusion Theories for Spheres and Spheroids," Ind. Eng. Chem. Res. 1997, 36, pp. 3154-3162.

(Continued)

*Primary Examiner*—Tam M Nguyen
(74) *Attorney, Agent, or Firm*—Bruce M. Bordelon

(57) ABSTRACT

This invention relates to a process for separating a heavy hydrocarbon stream to produce at least one permeate product stream and at least one retentate product stream. The process utilizes an ultrafiltration process to designed to maximize the quality of the permeate and retenate product streams as well as process embodiments which improve permeate production quantities as well as improve the quality of the product streams obtained by the separations process. In preferred embodiments, the process includes configuration and operational parameters to maximize permeate yield and selectivity.

13 Claims, 4 Drawing Sheets

U.S. PATENT DOCUMENTS

| | | |
|---|---|---|
| 4,259,170 A | 3/1981 | Graham et al. |
| 4,411,790 A | 10/1983 | Arod et al. |
| 4,504,377 A | 3/1985 | Shu et al. |
| 4,592,832 A | 6/1986 | Bristow et al. |
| 4,617,126 A | 10/1986 | Funk et al. |
| 4,661,241 A | 4/1987 | Dabkowski et al. |
| 4,797,200 A | 1/1989 | Osterhuber |
| 4,814,088 A | 3/1989 | Kutowy et al. |
| 4,816,140 A | 3/1989 | Trambouze et al. |
| 4,874,523 A | 10/1989 | LaFreniere |
| 4,892,660 A | 1/1990 | Sweet |
| 4,908,134 A | 3/1990 | Anderson |
| 4,946,594 A | 8/1990 | Thaler et al. |
| 4,963,303 A | 10/1990 | Anderson |
| 4,978,454 A | 12/1990 | Sweet |
| 4,982,051 A | 1/1991 | Pasternak et al. |
| 5,045,206 A | 9/1991 | Chen et al. |
| 5,045,354 A | 9/1991 | Feimer et al. |
| 5,107,056 A | 4/1992 | Chen et al. |
| 5,107,058 A | 4/1992 | Chen et al. |
| 5,107,059 A | 4/1992 | Chen et al. |
| 5,173,172 A | 12/1992 | Adams et al. |
| 5,180,496 A | 1/1993 | Sartori et al. |
| 5,191,151 A | 3/1993 | Eriksen et al. |
| 5,256,297 A | 10/1993 | Feimer et al. |
| 5,514,252 A | 5/1996 | Kerby, Jr. et al. |
| 5,635,055 A | 6/1997 | Sweet et al. |
| 5,643,442 A | 7/1997 | Sweet et al. |
| 5,749,943 A | 5/1998 | Shimazu et al. |
| 5,785,860 A | 7/1998 | Smith |
| 5,979,178 A | 11/1999 | Engler et al. |
| 6,180,008 B1 | 1/2001 | White |
| 6,187,987 B1 | 2/2001 | Chin et al. |
| 6,190,533 B1 | 2/2001 | Bradow et al. |
| 6,524,469 B1 | 2/2003 | Schucker |
| 6,525,469 B1 | 2/2003 | Huang et al. |
| 6,896,796 B2 | 5/2005 | White et al. |
| 7,018,517 B2 | 3/2006 | Kurita et al. |
| 7,041,212 B2 | 5/2006 | White et al. |
| 7,048,846 B2 | 5/2006 | White et al. |
| 2003/0019790 A1 | 1/2003 | Schucker |
| 2004/0026321 A1 | 2/2004 | Minhas et al. |
| 2004/0251166 A1 | 12/2004 | Alvarenga Baptista et al. |
| 2004/0251201 A1 | 12/2004 | Chau et al. |
| 2006/0016727 A1 | 1/2006 | Varadaraj |
| 2006/0231462 A1 | 10/2006 | Johnson |
| 2007/0090020 A1 | 4/2007 | Buchanan et al. |
| 2008/0116109 A1 | 5/2008 | McCoy et al. |

FOREIGN PATENT DOCUMENTS

| | | |
|---|---|---|
| EP | 0160142 | 11/1985 |
| EP | 0254359 B1 | 1/1988 |
| EP | 0146298 B1 | 5/1991 |
| EP | 0489573 B1 | 9/1995 |
| GB | 1266180 | 12/1969 |
| GB | 2268186 | 1/1994 |
| JP | 54013509 | 7/1977 |
| JP | 2000288371 | 4/1999 |
| JP | 2001038159 | 8/1999 |
| KR | 2002007235 | 1/2002 |
| WO | WO 00/06526 | 2/2000 |
| WO | WO 01/60771 A1 | 8/2001 |
| WO | WO 02/50212 A2 | 6/2002 |
| WO | WO 03/026781 A1 | 4/2003 |
| WO | WO 2004/018067 A2 | 3/2004 |
| WO | WO 2006/040328 A1 | 4/2006 |

OTHER PUBLICATIONS

Anna Duong, Goutam Chattopadhyaya, Wellington Y. Kwok, Kevin J. Smith; "An experimental study of heavy oil ultrafiltration using ceramic membranes," Fuel, vol. 76, No. 9, pp. 821-828, 1997.

B. D. Sparks, J. D. Hazlett, O. Kutowy, T. A. Tweddle; "Upgrading of Solvent Extracted Athabasca Bitumen by Membrane Ultrafiltration," AIChe Journal, Aug. 1990, vol. 36, No. 8, pp. 1279-1282.

Bruce Bishop, Robert Goldsmith, Robert Schucker, Keith Rawlins; "Ceramic Membrane Process for Upgrading Vacuum Residual Oil," Presentation at AIChE 2004 Spring Annual Meeting, New Orleans, LA, Apr. 25-29, 89d.

W. C. Lai, K. J. Smith; "Heavy oil microfiltration using ceramic monolith membranes," Fuel 80 (2001) pp. 1121-1130.

J. D. Hazlett, O. Kutowy, T. A. Tweddle, B. A. Farnand; "Processing of crude oils with polymeric ultrafiltration membranes," AIChE 1989 Spring National Meeting (Houston Apr. 2-6, 1989) AIChE Symposium Series V85 N. 272, 101-107 (1989).

Deqing Shi, Hongwei Yu, Jinrong Yang, Zhihau Zhang, Ying Kong; "Study on the separation performance of polyimide nanofiltration membrane for solvent recovery in the butanone-toluene dewaxing process of lube oil," Mo Kexue Yu Jishu (2005), 25(3), 50-53, 62. Abstract.

Zhi-Ping Zhao, Jiding Li, Jian Chen, Cui-Xian Chem; "Nanofiltration membrane prepared from polyacrylonitrile ultrafiltration membrane by low-temperature plasma," Journal of Membrane Science (2005), 251(1-2), 239-245. Abstract.

F. Petrus Cuperus, Katrin Ebert; "Non-aqueous application of NF," Nanofiltration (2005), 521-536, Editor(s): Schafer, A.I.; Fane, A.G.; Waite, Thomas D., Publisher: Elsevier Ltd., Oxford, UK. Abstract.

B. Bishop, R. Goldsmith, R. Schucker, K. Rawlins; "Ceramic membrane process for upgrading vacuum residual oil," 2004 AIChE Spring Meeting, Conference Proceedings, New Orleans, LA, 7p (2004) Abstract.

M. V. Veazey; "Tech trends: Microfiltration system," Materials Performance 43/5 15 (May 2004), Abstract.

T. Melin, M. Gallenkemper, J. Hoppe, C. Matthias, "Achema reports . Membrane engineering," Chemie-Ingenieur-Technik (Achema 2003 27(sup)t(sup)h International Exhibition-Congress on Chemical Engineering, 76/12 1869-1876, Dec. 2003., Abstract.

V. I. Il'In, V. A. Kolesnikov, A. V. D'Yachenko; "Electrically insulating petroleum oils and their refining," Oboronnyi Kompleks—Nauchno-Tekhnicheskomu Progressu Rossii (2002), (4), 69-71. Abstract.

A. P. Aleksandrin, A. A. Egorshev, O. V. Katsereva, E. A. Komyagin, V. N. Mynin, G. V. Terpugov; "Use of ceramic membranes for treatment end regeneration of depleted petroleum products," Tyazh. Mashinostr. -/6 30-32 (2002) Chemical Abstracts 138/5-6 Abstr. No. 58512 (2003). Abstract.

"Process industries exposition: Membrane rejects emulsified oils while maintaining hydrophilic properties," Chemical Engineering Progress 97/4 26 (Apr. 2001). Abstract.

K. J. Smith, W. C. Lai; "Heavy oil microfiltration using ceramic monolith membranes," Fuel, 80/8, 1121-1130 (Jun. 2001). Abstract.

R. M. Gould, L. S. White, C. R. Wildemuth; "Membrane separation in solvent lube dewaxing," Environmental Progress, 20/1, 12-16 (Apr. 2001). Abstract.

N. A. Bhore, R. M. Gould, S. M. Jacob, P. O. Staffeld, D. McNally, P. H. Smiley, C. R. Wildemuth; "New membrane process debottlenecks solvent dewaxing unit," Oil and Gas Journal, 97/46, 67-68, 70, 72-24 (1999 1115). Abstract.

Jiao-Li Li, Xu-Xiang Li, Bing-Hua Ni; "Development of ultrafiltration and its application in recovery of dewaxing solvent," Shihua Jishu Yu Yingyong (2000), 18(5), 295-297, 301. Abstract.

S. Elmaleh, N. Ghaffor; "Upgrading oil refinery effluents by crossflow ultrafiltration," Water Science & Technology, 34(9), 231-238 (1996), Aqualine Abstracts Abstr. No. 97-4463 V13 N.9 (Sep. 1997). Abstract.

B. Park, V. S. Ravi-Kumar, T. T. Tsotsis; "Models and simulation of liquid—phase membrane reactors," Industrial & Engineering Chemistry Research, V37 N. 4, 1276-89 (Apr. 1998). Abstract.

A. Duong, K. J. Smith; "A model of ceramic membrane fouling during heavy oil," Canadian Journal of Chemical Engineering, V75 N. 6, 1122-29 (Dec. 1997). Abstract.

M. Garcia Sanchez, J. L. Perez Pavon, B. Moreno Cordero; J. Chromatogr., A, 766 (1+2), 61-69 (1997) Chemical Abstracts Abstr. No. 319181 V126 N. 24. Abstract.

V. S. Ravi-Kumar, T. T. Tsotsis, M. Sahimi; "Studies of the transport of asphaltenes through membranes using hindered diffusion theories for spheres and spheroids," Industrial & Engineering Chemistry Research, V36 N. 8, 3154-62 (Aug. 1997). Abstract.

V. S. Ravi-Kumar, L. Yang, T. T. Tsotsis; "Liquid-phase reactive applications with inorganic membranes : Models and experiments," ACS $214^{th}$ National Meeting (Las Vegas Sep. 7-11, 1997) Book of Abstracts Part 2 Abstr. No. PMSE-273 (1997). Abstract.

A. Duong, G. Chattopadhyaya, W. Y. Kwok, K. J. Smith; "An experimental study [using Cold Lake (Alberta) oil] of heavy oil ultrafiltration using [single-tube] ceramic membranes," Fuel, V76, N. 9, 821-28 (Jul. 1997). Abstract.

S. Elmaleh, N. Ghaffor; "Upgrading oil refinery effluents by cross-flow ultrafiltration," Water Sci. Technol., 34(9), Water Quality International '96 Part (2), 231-238 (1996) Chemical Abstracts Abstr. No. 79315, V126 N. 6. Abstract.

E. Beaver, Siegel; 'Technologies critical to a changing world / Clean technologies), AIChE et al. $5^{th}$ World Chemical Engineering Congress (San Diego Jul. 14-18, 1996) Summary Proceedings 100-03, 159-61 (Oct. 1996). Abstract.

W. Ying, B. Tansel; "Effect of coagulation on fouling rate and cleanability of ultrafiltration membranes," Purdue University $50^{th}$ Industrial Waste Conference (West Lafayette, IN May 8-10, 1996) Proceedings 285-95 (1995). Abstract.

J. L. Humphrey; "Separation processes: Playing a critical role," Chemical Engineering Progress, V91, N. 10, 31-41 (Oct. 1995). Abstract.

V. N. Zrelov, N. G. Postnikova, L. V. Krasnaya; "Rapid membrane (diffusion) methods for determining mechanical impurities in liquid petroleum products," Khimiya I Tekhnologiya Topliv i Masel, N. 4, 28-30 (1994). Abstract.

B. D. Sparks, J. D. Hazlett, O. Kutowy, T. A. Tweddle, Union Carbide Corp.; "Upgrading of solvent extracted Athabasca bitumen by membrane ultrafiltration," AIChE Journal V36, N. 8, 1279-82 (Aug. 1990). Abstract.

R. J. Torres-Ordonez, S. G. Kukes, F. S. Lee, D. C. Cronauer; "Characterization of solids from coal/resid(ue) coprocessing," ACS $200^{th}$ National Meeting (Washington, DC Aug. 26-31, 1990) ACS Division of Fuel Chemistry Preprints V35 N.4, 1048-55 (1990). Abstract.

J. D. Hazlett, O. Kutowy, T. A. Tweddle, B. A.Farnand; "Processing of Crude Oils with Polymeric Ultrafiltration Membranes," Nat'l. Res. Counc. Can.; Can. Cent. Miner. Energy Technol, 1989 AIChE Spring Nat'l Meeting (Houston Apr. 2-6, 1989), Prepr. N. 64f 18P.

B. D. Sparks, J. D. Hazlett, O. Kutowy, T. A. Tweddle; "Upgrading of solvent extracted Athabasca bitumen by Membrane ultrafiltration," AIChE 1987 Summer Natl. Meet. (Minneapolis 816-19/87 Prepr. N. 7D 22P. Abstract.

M. Nishimura; "Application and development of membrane separation processes in oil chemistry and its related fields," Yakagaku, 34(3), 171-7 (1985), Chem. Abstr. Abstr. No. 168846 V102 N. 20. Abstract.

D. S. Schuster, C. A. Irani; "Understanding the pour point depression mechanism—2, microfiltration analysis of crude oils," $189^{th}$ ACS Natl. Meet. (Miami Beach Apr. 28-May 3, 1985) ACS Div. Fuel Chem. Prepr. V30 N.1, 169-77 (1985). Abstract.

J. Durandet; "Separation (Processes) in the refining industry/introduction separations dans le raffinage/introduction," Pet. Tech. N.298 5-6 (May 1983). Abstract.

J. Briant, G. Hotier; "The state of asphaltenes in hydrocarbon mixtures the size of molecular clusters," Rev. Inst. Fr. Pet. V38 N.1 83-100 (Jan.-Feb. 1983). Abstract.

D. Defives, R. Avrillon, C. Miniscloux, R. Roullet, X. Marze; "Regeneration of used lubricating oils by ultrafiltration," Informations Chimie (1978), 175, 127-31. Abstract.

A. Duong, K. Smith, JCS University of British Columbia; Canadian Journal of Chemical Engineering V75 N. 6, 1122-29 (Dec. 1997). Abstract.

V. N. Zrelov, N. G. Postnikova, L. V. Krasnaya; "Analytical filtration of petroleum and synthetic products through membranes," Khim. Tekhnol. Topl. Masel (1984), (11), 32-4. Abstract.

R. J. Thrash, R. H. Pildes; "The diffusion of Petroleum asphaltenes (from a Middle East high-sulfur vacuum residuum) through well characterized (MICA) porous membranes," $181^{st}$ ACS Natl. Meet (Atlanta Mar. 29-Apr. 3, 1981) ACT Div. Pet. Chem. Prepr. V26 N.2515-25 (Mar. 1981). Abstract.

G. Sartori, W. S. Ho, R. E. Noone, B. H. Ballinger; "(New) poly(fluoroolefin) membranes for aromatics/saturates separation," AIChE 1997 Annual Meeting (Los Angeles Nov. 16-21, 1997) Preprint N.32d 6P. Abstract.

V. S. Ravi-Kumar, I. A. Webster, T. T. Tsotsis, R. C. Sane, M. Sahimi; "Studies of diffusion of petroleum liquid macromolecules through model membranes," AIChE 1992 Annual Meeting (Miami Beach Nov. 1-5, 1992) Preprint N.22g 3P. Abstract.

R. C. Sane, I. A. Webster, T. T. Tsotsis, V. S. Ravi-Kumar; "Studies of asphaltene diffusion and structure and their implications for resid(uum) upgrading," $12^{th}$ International "Chemical Reaction Engineering Today" Symposium (Turin, Italy Jun. 28-Jul. 1, 1992) Chemical Engineering Science V47 N.9-11 2683-88 (Jun.-Aug. 1992). Abstract.

R. C. Sane; "The diffusion of petroleum asphaltenes in porous membranes," University of Southern California, Dissertation (1991) (Abstract) Dissertation Abstracts International: Section B Science & Engineering V52 N.8 4350-B (Feb. 1992). Abstract.

Yong Woo Rho, Hwayong Kim, Won Hee Park; "Effect of oil viscosity on ultrafiltration flux," Hwahak Konghak (1989), 27(4), 446-50. Abstract.

Yujun Song, Fuan Liu, Yong Yang, Jian Zou, Benhui Sun, Tianyuan Zhong; "Review on the preparation and application of nanofiltration membrane," Huagong Keji (1999), 7(3), 1-7. Abstract.

May-Britt Haag; "Membranes in chemical processing. A review of applications and novel developments," Separation and Purification Methods (1998), 27(1), 51-168. Abstract.

H. Zuern, K. Kohlhase,K. Hedden, J. Weitkamp; "Developments in refinery technology—1. Process technology, processing of crudes, residua, and heavy oils," $50^{th}$ DGMK Anniv. Meet (Berline Nov. 24-26, 1983) Erdoel Kohle, Erdgas, Petrochem. Brennst. Chem. V37 N.2 52-69 (Feb. 1984). Abstract.

R. E. Baltus, J. L. Anderson; "Hindered diffusion of asphaltenes through microporous membranres," Chemical Engineering Science (1983), 38(12) 1959-69. Abstract.

A. Duong, K. J. Smith; "A model of ceramic membrane fouling during heavy oil ultrafiltration," Canadian Journal of Chemical Engineering V75 N.6 1122-29 (Dec.1997). Abstract.

PROCESS FOR SEPARATING A HEAVY OIL FEEDSTREAM INTO IMPROVED PRODUCTS

This application claims the benefit of U.S. Provisional Application No. 60/966,517 filed Aug. 28, 2007.

FIELD OF THE INVENTION

This invention relates to a process for separating a heavy hydrocarbon stream to produce at least one permeate product stream and at least one retentate product stream. The process utilizes an ultrafiltration process designed to maximize the quality of the permeate and retentate product streams as well as process embodiments which improve the value of the product streams obtained by the separations process. In preferred embodiments, the process includes configuration and operational parameters to maximize permeate yield and selectivity.

BACKGROUND OF THE INVENTION

As the demand for hydrocarbon-based fuels has increased, the need for improved processes for separating hydrocarbon feedstocks of heavier molecular weight has increased as well as the need for increasing the conversion of the heavy portions of these feedstocks into more valuable, lighter fuel products. These heavier, "challenged" feedstocks include, but are not limited to, low API gravity, high viscosity crudes from such areas of the world as the Middle East, Mexico, Venezuela, Russia, as well as less conventional refinery feedstocks derived from such sources as bitumen, shale oil and tar sands. It is also important that heavy crude fractions, such as atmospheric resids, vacuum resids, and other similar intermediate feedstreams containing boiling point materials above about 850° F. are processed in such a manner so as to improve their ability to be utilized as feedstreams for subsequent refining and petrochemical processes such as, but not limited to, fuels blending, fuels upgrading, catalytic conversion, and lube oils production and upgrading.

Most conventional refineries have crude distillation units which are designed to distill lighter boiling point fractions from the heavier boiling point crude fractions. These distillations are typically performed in refineries in at least two discrete distillations. The first of these crude or heavy oil distillations is commonly termed as "crude atmospheric distillation" which is performed in a distillation tower with an overhead pressure regulated approximately at or slightly above atmospheric pressure (14.7 psia). The bottoms or heaviest fractions obtained from the atmospheric distillation process (generally termed as "atmospheric resid") are sent for further distillation at sub-atmospheric distillation pressures. Generally, in a modern petrochemical refinery, the atmospheric resid is further distilled at these sub-atmospheric distillation pressures in what is generally termed as "crude vacuum distillation". In some refineries, the atmospheric resid may undergo some intermediate distillation steps, but usually the heaviest portions of the atmospheric resid stream end up in the feedstream to the crude vacuum distillation process.

In the crude vacuum distillation process, the feedstream comprising atmospheric resid is further separated in sub-atmospheric distillation conditions. Typically, the crude vacuum distillation column is operated at below about 7 psia, but most preferably about 2 psia or lower. The decreased partial pressures of the feedstream allows heavier hydrocarbon fractions to be distilled in the crude distillation column than would be possible under atmospheric conditions at the same feed temperature thereby increasing the volume of intermediate boiling point products isolated in the crude distillation process.

Generally, the bottoms or heaviest fractions obtained from the crude vacuum distillation process (generally termed as "vacuum resid") cannot be further separated by distillation and are sent for further processing in the refinery which either requires further separation of components by methods such as solvent extraction or thermal conversion. However, these processes can be very expensive to operate and/or can result in a significant amount of valuable component loss in the final product.

What is needed in the industry is a separations process which does not require extractive solvents and further separates the compounds in a heavy oil feedstream which does not thermally alter the overall composition of the final products. It is desired that the separated product streams from such a process have compositional qualities that will increase the value of at least one, but preferably all of product streams as intermediate product streams for further refinery/petrochemical processes or products.

SUMMARY OF THE INVENTION

This invention includes an ultrafiltration process for separating a heavy hydrocarbon stream to produce at least one permeate product stream and at least one retentate product stream for use as intermediate product streams for further refinery/petrochemical processes or products. In preferred embodiments, this invention may be utilized to separate heavy hydrocarbon feedstreams, such as whole crudes, topped crudes, synthetic crude blends, oils derived from shale, oils derived from bitumen, oils derived from tar sands, atmospheric resids, vacuum resids, or other heavy hydrocarbon streams into at least two intermediate product streams. In a preferred embodiment, the heavy hydrocarbon feedstream is comprised of a crude vacuum distillation resid (or "vacuum resid").

An embodiment of the present invention is a process for separating a heavy hydrocarbon stream, comprising:

a) contacting the heavy hydrocarbon stream with at least one porous membrane element in a membrane separation zone wherein the heavy hydrocarbon feedstream contacts a first side of the porous membrane element;

b) retrieving at least one permeate product stream from a second side of the porous membrane element, wherein the permeate product stream is comprised of selective materials which pass through the porous membrane element from the first side of the porous membrane element and are retrieved in the permeate product stream from the second side of the porous membrane element;

c) retrieving at least one retentate product stream from the first side of the porous membrane element;

d) conducting at least a portion of the permeate product stream to a first refinery process unit selected from a fluid catalytic cracking (FCC) unit and a steam cracking unit; and e) conducting at least a portion of the retentate product stream to a second refinery process unit;

wherein the CCR % Rejection based on the permeate product stream and the heavy hydrocarbon stream is at least 10%.

In a preferred embodiment, the porous membrane element is comprised of a material selected from ceramics, metals, glasses, polymers, and combinations thereof. In yet another preferred embodiment, the porous membrane element has an average pore size of about 0.001 to about 2 microns.

In another embodiment, the second refinery process unit is an asphalt blending unit, a thermal coker unit, or a fuel oil blending unit. While in another preferred embodiment, the Reynolds number of the stream on the first side of the porous membrane element is at least about 2000.

The present invention also includes an embodiment of the general process as described above, wherein at least a portion of the permeate product stream is also hydrotreated prior to being conducted to the first refinery process unit.

DETAILED DESCRIPTION OF THE PREFERRED EMBODIMENTS

Figure 1:
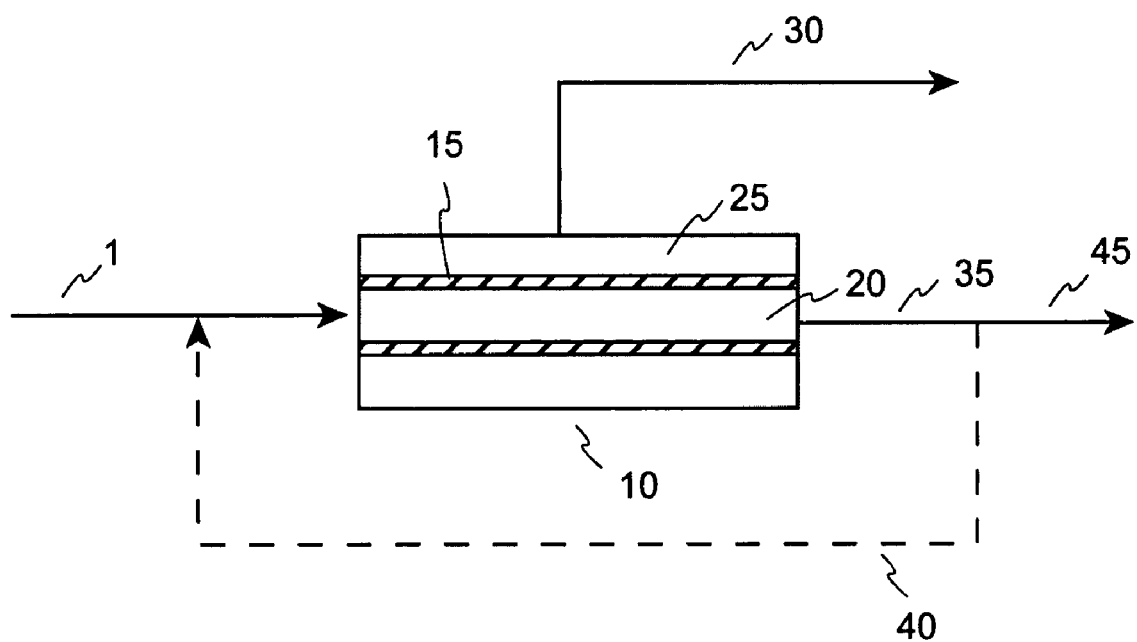
FIG. 1 illustrates one embodiment of the ultrafiltration process of the present invention wherein a heavy hydrocarbon feedstream is separated into at least one permeate product stream and at least one retentate product stream. Alternatively, at least a portion of the retentate product stream may also be recycled and combined with the heavy hydrocarbon stream prior to the combined stream contacting the membrane module.

This invention includes an ultrafiltration process for separating a heavy hydrocarbon stream to produce at least one permeate product stream and at least one retentate product stream for use as intermediate product streams for further refinery/petrochemical processes or products. In preferred embodiments, this invention may be utilized to separate heavy hydrocarbon feedstreams, such as whole crudes, topped crudes, synthetic crude blends, shale derived oils, bitumen derived oils, tar sands derived oils, atmospheric resids, vacuum resids, or other heavy hydrocarbon streams to produce at least one permeate product stream and at least one retentate product stream for use as intermediate product streams for further refinery/petrochemical processes or products. Some of the terms utilized herein are defined as follows.

The "Micro Carbon Residue" (or "MCR") as used herein is a measure of carbon content of a sample as measured per test method ASTM D4530. The terms "Micro Carbon Residue" ("MCR") and "Conradson Carbon Residue" ("CCR") are considered as equivalent values as used herein and these terms are utilized interchangeably herein.

The term "initial boiling point" as used herein is defined as the temperature at which 5 wt % of the mixture is volatized at atmospheric (standard) pressure. The term "final boiling point" as used herein is defined as the temperature at which 95 wt % of the mixture is volatized at atmospheric (standard) pressure.

The term "hydrocarbon feedstream", "hydrocarbon-containing stream" or "hydrocarbon stream" as used herein is defined as a fluid stream that is comprised of at least 80% hydrocarbon containing compounds by weight percentage.

The term "heavy hydrocarbon" or "heavy hydrocarbon feedstream" as used herein is defined as a hydrocarbon containing composition wherein the final boiling point as defined above is at least 1100° F.

The term "transmembrane pressure" as used herein is defined as the difference in pressure as measured across a membrane element being the difference in pressure between the higher pressure feed/retentate side of the membrane element and the lower pressure permeate side of the membrane elements.

The current invention utilizes a small pore membrane to separate a heavy hydrocarbon feedstream, preferably comprising a vacuum resid feedstream into at least one permeate product stream and at least one retentate product stream. As noted prior, in most conventional crude refineries, the vacuum resid components obtained from the crude unit feedstream cannot be significantly further distilled without resulting in the significant degradation of the products. At higher distillation temperatures than those utilized in the vacuum distillation process, excessive thermal cracking occurs producing coke which is detrimental to most downstream refinery equipment and processes and when recoverable, is generally a very low value product of the refinery industry. Therefore, it is desirable to further separate the vacuum resid components into valuable intermediate products in a process that does not substantially produce coke.

One embodiment of the current invention is shown in FIG. 1. In this figure, a heavy hydrocarbon stream (1) contacts at least one membrane (15) in a membrane separations unit (10). The membrane separations unit (10) contains at least one membrane (15) and the membrane separations unit (10) is comprised of at least one retentate zone (20) wherein the heavy hydrocarbon feedstream contacts a first side of a permeable membrane, and at least one permeate zone (25) from which at least one permeate product stream (30) is obtained from the opposite or second side of the membrane and such permeate product obtained is comprised of materials that selectively permeate through the membrane (15).

The embodiment as shown in FIG. 1 utilizes an ultrafiltration process to separate the feedstream into at least one permeate product stream (30) and at least one retentate product stream (35) wherein at the retentate product stream is drawn from at least one retentate zone (20) of the membrane separations unit (10). In an embodiment, at least a portion of the retentate product stream may be recycled as a recycled retentate stream (40) and combined with the heavy hydrocarbon stream (1) prior to contacting at least one membrane (15) in a membrane separations unit (10). The remainder of the retentate product (45) is sent for further processing or product blending.

It should be noted that in embodiments of the present invention, it is not necessary that a portion of the retentate product stream be recycled for combination with the heavy hydrocarbon stream. However, in embodiments wherein a portion recycled retentate product is combined with the heavy hydrocarbon stream this combination may occur prior to entering the membrane separations unit or this combination may occur within one of the retentate zones of the membrane separations unit. Also, depending upon more complex arrangements such as multiple internal stages, series or parallel multiple unit operations, and/or membrane unit configurations knowledgeable to those skilled in the art, that more than one membrane may be utilized and that more than one permeate product stream and/or retentate stream may be obtained from the membrane unit.

In a preferred embodiment, the heavy hydrocarbon feedstream is flowed across the face of the membrane element(s) in a "cross-flow" configuration. In this embodiment, in the retentate zone, the first feedstream contacts one end of the membrane element and flows across the length of the membrane, while a retentate product stream is withdrawn from the other end of the retentate zone. As the feedstream/retentate flows across the face of the membrane, the permeate components flow through the membrane to the permeate zone wherein the permeated components are drawn off as a permeate product stream. This crossflow arrangement is also illustrated in FIG. 1.

It is desired that certain components of the first feedstream will selectively permeate through the membrane while other components are selectively retained in the retenate product stream. In preferred embodiments of the present invention, it is desired to reduce the Conradson Carbon Residue (also termed herein as "CCR" or "MCR") content as well as reduce the content of select metals in the permeate obtained from the process. Even more preferred is to substantially maintain the "selectivity" (or reduction) of these components in the permeate product stream while maintaining permeate product production (or "flux") rates in the process.

Figure 4:
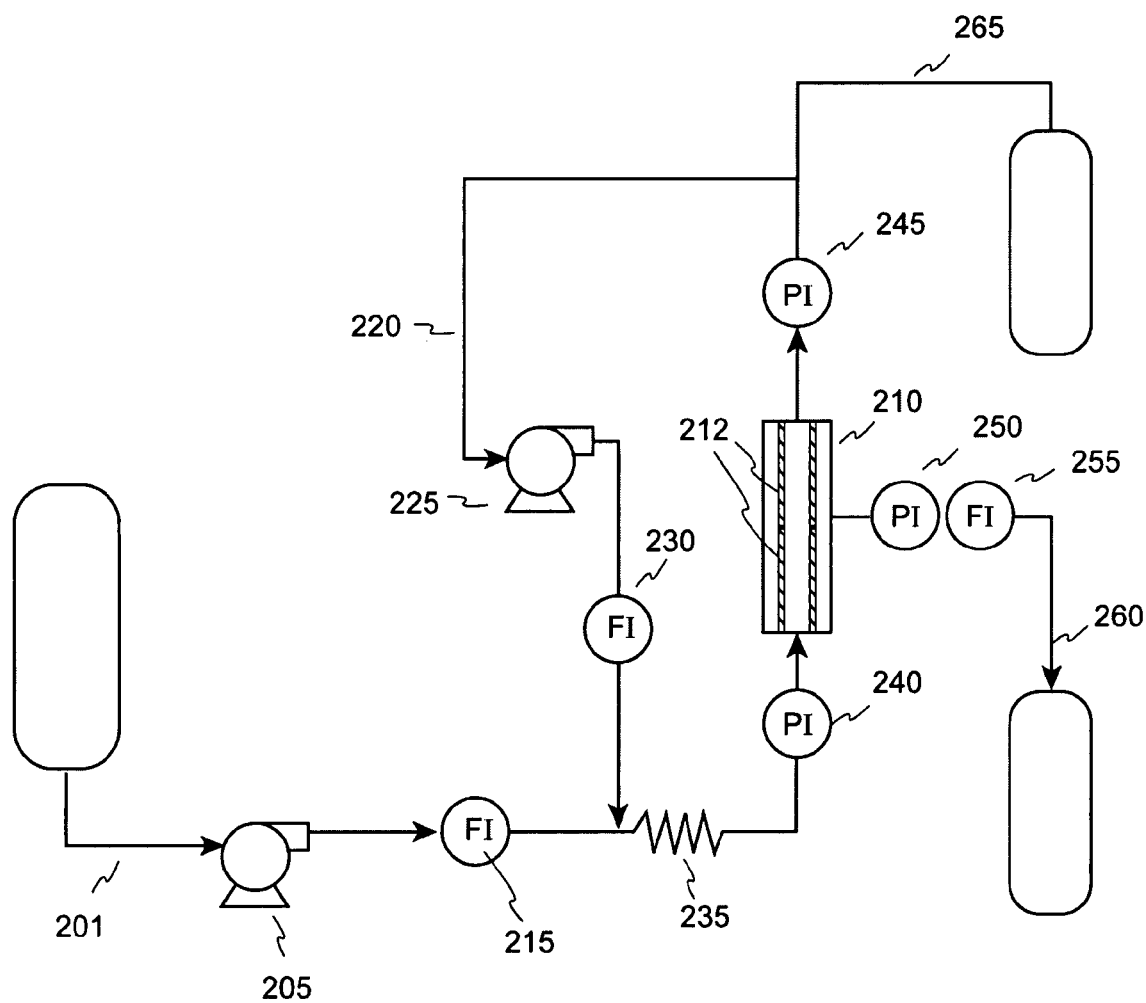
FIG. 4 illustrates the pilot plant utilized for the process testing of Examples 1 through 4.

The Reynolds number of the process stream in the membrane separations unit can significantly affect the quality and production rates of the desired permeate product. Examples 1 through 4 illustrate four separate experiments run at differing test conditions using the pilot plant configuration as shown in FIG. 4 and described in the Examples Section. In all of the Examples, the transmembrane pressure was held at about 400 psig, while flow rates, flow ratios, and temperatures, were varied to obtain a permeate yield of about 50 wt %. Permeate flux rates were measured during the testing, and analysis was performed on the Fresh Feed, and the Permeate and Retentate Products obtained for Micro Carbon Residue (also termed "MCR" or "CCR" herein), nickel, iron, and vanadium contents. Viscosities of the Fresh Feed and final products from Examples 1 through 3 were also measured and presented in Table 3.

It has been observed that the permeate flux rate is dependent upon the Reynolds number of the flow through the membrane. As can be seen comparing the data from Examples 1 through 4 in Table 1, Example 1 was operated at a cross flow velocity of about 3.2 ft/sec and a Reynolds number of about 1,417. The Permeate Flux obtained from the conditions of Example 1 was only about 1.56 gal/ft²/day. In Example 2, the transmembrane pressure and temperature was maintained similar to the conditions of Example 1, about 400 psig and about 260° C., respectively. However, both the fresh feed rate and the retentate recycle rate were increased to obtain a cross-flow velocity of about 15.0 ft/sec. As can be seen in Table 1, the Permeate Flux increased significantly as compared to Example 1 to about 4.35 gal/ft²/day. The Reynolds number under these conditions was calculated to be about 6,485. It should be noted that under the conditions of Example 1, a significant improvement in Permeate Flux was achieved with no significant detrimental impacts to CCR, nickel, or vanadium reductions, which are shown in Table 1.

In Example 3, the crossflow velocity was held at approximately the same rate as Example 2, at about 15.0 ft/sec. However, the temperature was increased from about 260° C. to about 290° C. The Reynolds number ($R_e$) through the membrane is determined by the formula for incompressible flow:

$$R_e = DV\rho/\mu \text{ (dimensionless)} \quad [001]$$

Wherein:
D=the internal diameter of the membrane tube
V=the average flow velocity of the fluid through the membrane tube (i.e., the retentate zone)
$\rho$=the density of the fluid
$\mu$=the absolute viscosity of the fluid The temperature in Example 3 was increased from about 260° C. in Example 2 to about 290° C. in Example 3 and its resulting impact on the fluid viscosity ($\mu$) was the main factor for the increase the calculated Reynolds number of about 9,807 in Example 3. As can be seen by comparing the data obtained from the Example 2 conditions to the Example 3 conditions shown in Table 1, the approximate 50% increase in the Reynolds number resulted in an approximate 100% increase in the Permeate Flux rate from Example 2 to Example 3. Here, the increase in Reynolds number was not a function of the crossflow velocities as the crossflow velocities of Examples 2 and 3 were essentially held the same.

In a preferred embodiment of the present invention, the Reynolds number ($R_e$) in the retentate zone of the membrane module is at least about 2,000. In another embodiment, the Reynolds number ($R_e$) in the retentate zone of the membrane module is at least about 4,000; more preferably, the Reynolds number is at least about 6,000; and even more preferably, the Reynolds number is at least about 8,000. It should be noted that the Reynolds numbers above can be an average Reynolds number of the overall modules in the membrane separations unit or the Reynolds numbers of any module or active portion of the overall membrane separations unit.

In embodiments of the current process, the heavy hydrocarbon feed rate may be of sufficient volumetric rates to maintain the Reynolds number in the retentate zone(s) sufficiently high enough to maintain the desired permeate flux rates and/or separations selectivities. In other embodiments of the current invention, a portion of at least one retentate product streams can be recycled and combined with the heavy hydrocarbon feedstream either prior to the heavy hydrocarbon entering a retentate zone of the membrane separations unit or the streams may be combined in at least one retentate zone of the membrane separations unit. FIG. 1 shows one embodiment, wherein a portion of a retentate stream (35) from the membrane separations unit (10) is separated into a recycled retentate stream (40) and combined with the heavy hydrocarbon stream (1) prior to contacting the membrane element (15). In this manner, sufficient cross-flow velocity can be maintained in the retentate zone of the separations unit even at low heavy hydrocarbon feedstream rates. This retentate recycle configuration can also be economically attractive wherein low heavy hydrocarbon feedstream rates are utilized in the process or wherein significant fluctuations in the heavy hydrocarbon feedstream may be experienced. In one embodiment, the ratio of retentate recycle flow rate to heavy hydrocarbon feedstream flow rate is greater than about 1, more preferably greater than about 10, and even more preferably greater than about 25. This ratio of retentate recycle flow rate to heavy hydrocarbon feedstream flow rate is measured and defined herein on a volumetric basis.

Although not wishing to be held to any particular theory, it is believed that it is beneficial to maintain the operating the conditions in the retentate zone of the membrane separations unit at a Reynolds number sufficient to maintain a thin retentate formed layer or coating onto the permeate side face of the membrane element(s) which if too thick, can excessively restrict the flux of the permeate through the active membrane element. It is also believed herein that improvements in the flux and selectivity current process may be obtained by inducing vibrations into the membrane module and/or membrane separations system/housing to assist in the manipulation of this restrictive layering of the retentate stream. The vibrations may be induced into membrane module and/or membrane separations housing by mechanical or electromechanical means, such as, but not limited to, the use of a shaker apparatus or electromechanically induced vibratory amplifiers. Additionally, such vibrations may be induced directly into the feedstream conducted to or in the membrane unit, rather than the housing of the membrane unit itself.

In Example 4, a membrane module with a smaller average pore size than was used in Examples 1 through 3 was tested. In Example 4, the average pore size of the active membrane layer was about 0.02 micrometers (μm) as compared with an average pore size of the active membrane layer in Examples 1 through 3 of about 0.1 μm. The transmembrane pressure, temperature and crossflow velocities utilized in Example 4 were similar to those of Example 2. The results from the test conditions of Example 4 are shown in Table 1. Example 4 illustrates that small changes in the membrane module nominal pore size do not have a significant impact on the overall process performance. The Permeate Flux rate, as well as the CCR, nickel, and vanadium rejection rates obtained from Example 4 were similar to those obtained in Example 2 showing that small changes in the membrane module nominal pore size can be made in the pore size ranges without significant impacts on the overall performance of the process.

In a preferred embodiment of the present invention, at least one membrane has an average pore size of about 0.001 to about 2 microns (μm), more preferably about 0.002 to about 1 micron, and even more preferably about 0.004 to about 0.1 microns. It is also preferred that the membranes utilized in the present invention be constructed of such materials and designed so as to withstand prolonged operation at elevated temperatures and transmembrane pressures. In one embodiment of the present invention the membrane is comprised of a material selected from a ceramic, a metal, a glass, a polymer, or combinations thereof. In another embodiment, the membrane comprised of a material selected from a ceramic, a metal, or combination of ceramic and metal materials. Particular polymers that may be useful in embodiments of the present invention are polymers comprised of polyimides, polyamides, and/or polytetrafluoroethylene provided that the membrane material chosen is sufficiently stable at the operating temperature of the separations process.

Although it is not believed to be necessary to obtain the separations results shown herein, it is preferable that the transmembrane pressure be above about 400 psi. It has been discovered that selective separation of certain components may be enhanced at these higher transmembrane pressures. Preferably the transmembrane pressure is at least 700 psi, more preferably at least 1000 psi, even more preferably at least 1200 psi, and most preferably at least 1500 psi. The preferred transmembrane pressure ranges for operation of the present invention are about 700 to about 3000 psi, more preferably about 700 to about 2500 psi, even more preferably about 1000 to about 2000 psi.

Also, in other preferred embodiments of the present invention, the temperatures of the heavy hydrocarbon feedstream when contacting the membrane element is from about 100 to about 350° C., and more preferably about 100 to about 300° C. For heavy hydrocarbon feedstreams containing a substantial portion of vacuum resids, the most preferable temperature is about 200 to about 300° C. The current invention can operate at feedstream temperatures above 350° C., but it is preferred that the feedstream be below a temperature wherein thermal cracking of the feedstream is minimized.

As can be seen from Table 1, the process of the present invention results in significant reduction of Micro Carbon Residue ("MCR" or "CCR") content, nickel content and vanadium content in the produced permeate. The CCR % Rejection is the percent reduction of the CCR content in the permeate product as compared to the CCR content of the heavy hydrocarbon feedstream and is calculated by the following formula:

$$CCR\% \text{ Rejection} = \frac{MCR \text{ wt \% of the feedstream} - MCR \text{ wt \% of the permeate}}{MCR \text{ wt \% of the feedstream}} \times 100 \qquad [002]$$

In a preferred embodiment, the process achieves a CCR % Rejection of at least about 10%, preferably at least about 20%. The Nickel % Rejection and the Vanadium % Rejection are calculated in a similar manner to the CCR % Rejection. The Nickel % Rejection is the percent reduction of the nickel content in the permeate product as compared to the nickel content of the heavy hydrocarbon feedstream and in preferred embodiments of the present invention, the Nickel % Rejection is at least about 25%, preferably at least about 35%. The Vanadium % Rejection is the percent reduction of the vanadium content in the permeate product as compared to the vanadium content of the heavy hydrocarbon feedstream and in preferred embodiments of the present invention, the Vanadium % Rejection is at least about 25%, preferably at least about 35%.

Returning to Example 4, although the membrane modules described in Example 4 had an smaller average pore size than those utilized in Examples 1 through 3, the membrane modules utilized in Example 4 had a larger maximum pore size as measured by ASTM Method F316 "Standard Test Methods for Pore Size Characteristics of Membrane Filters by Bubble Point and Mean Flow Pore Test" utilizing methanol as a test fluid. The membrane modules in Examples 1 through 3 had a Membrane Bubble Point Maximum Pore Size of about 1.84 μm while the membrane modules in Example 4 had a Membrane Bubble Point Maximum Pore Size of about 2.97 μm (see Table 1). As noted above, relatively small deviations in the maximum pore size of the membrane modules appear to have little effect on the steady state operation of the process of the present invention.

However, it has unexpectedly been discovered that relatively small differences in the membrane bubble point maximum pore size have significant effects in the start up and stabilization the separations process of the present invention. Tests were run to determine these effects. In a first test utilizing membrane modules similar to those used in Examples 1 through 3 with an average pore size of the active membrane layer of about 0.1 micrometers (μm) and a membrane bubble point maximum pore size of about 1.84, it took approximately 5 hours at a membrane unit feed temperature of about 500° F. (260° C.) to obtain a steady state membrane pressure of about 400 psi. In contrast, in a second test utilizing membrane modules similar to those used in Example 4 with an average pore size of the active membrane layer of about 0.02 micrometers (μm) and a membrane bubble point maximum pore size of about 2.97, it took approximately 96 hours at a membrane unit feed temperature of about 400° F. (204° C.) to obtain a steady state membrane pressure of about 400 psi. In an embodiment of the present, the membrane bubble point maximum pore size of at least one of the membranes is less than about 2.0 μm, more preferably less than about 1.75 μm, and most preferably less than about 1.5 μm. The membrane bubble point maximum pore size ranges as used herein are as determined by ASTM Method F316 "Standard Test Methods for Pore Size Characteristics of Membrane Filters by Bubble Point and Mean Flow Pore Test" utilizing methanol as a test fluid.

Figure 2:
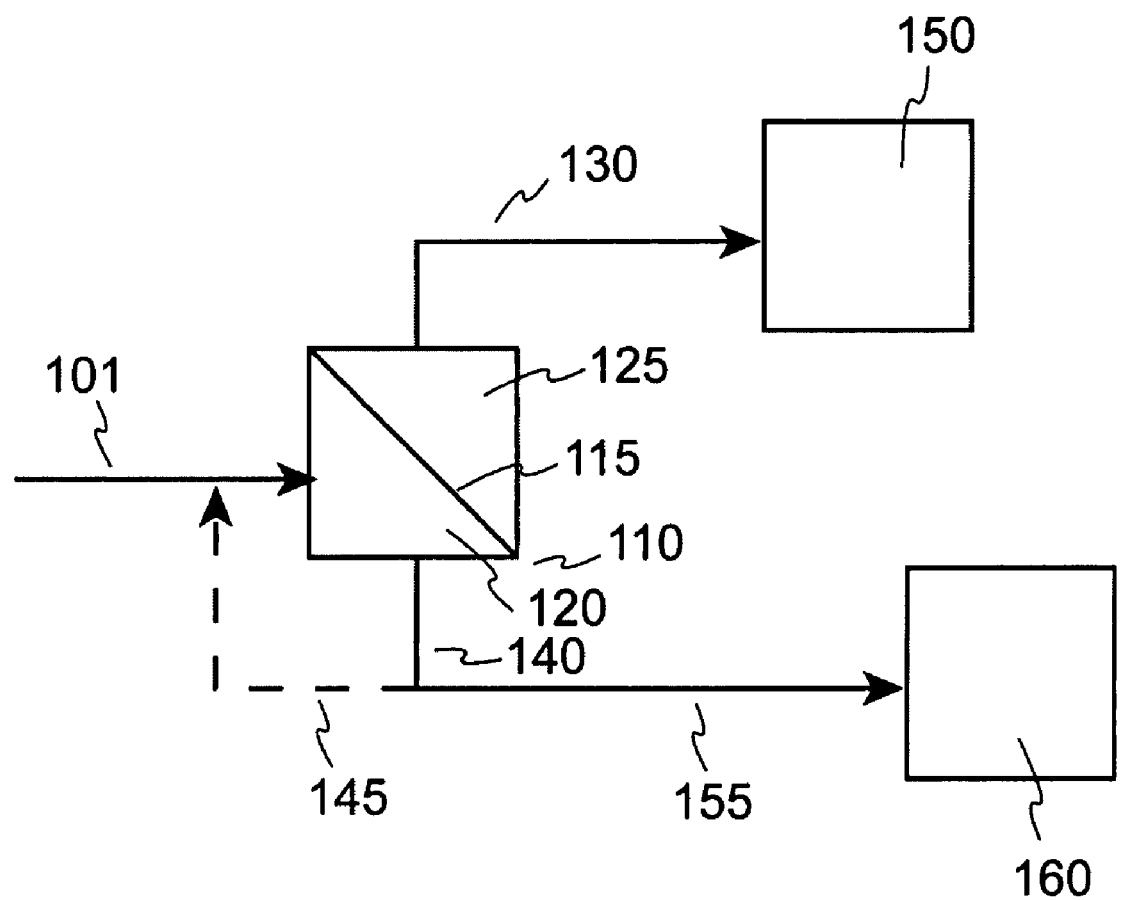
FIG. 2 illustrates one embodiment of the ultrafiltration process of the present invention wherein a heavy hydrocarbon feedstream is separated into at least one permeate product stream and at least one retentate product stream and at least a portion of the permeate and retentate product streams are further processed in refinery/petrochemical process units. Alternatively, at least a portion of the retentate product stream may also be recycled and combined with the heavy hydrocarbon stream prior to the combined stream contacting membrane module.

FIG. 2 shows a preferred process embodiment of the present invention. In this embodiment, a heavy hydrocarbon stream (101) contacts at least one membrane (115) in a membrane separations unit (110). The membrane separations unit (110) contains at least one membrane (115) and the membrane separations unit (110) is comprised of at least one retentate zone (120) wherein the heavy hydrocarbon feedstream contacts a first side of a permeable membrane, and at least one permeate zone (125) from which at least one permeate product stream (130) is obtained from the opposite or second side of the membrane and such permeate product obtained is comprised of materials that selectively permeate through the membrane (115). Additionally, at least one retentate product stream (140) is obtained from the membrane separations unit (110).

At least a portion of the permeate product stream obtained is further processed in a first refinery process unit (150) designed to upgrade the permeate product stream into one or more final or intermediate products. In a preferred embodiment, the first refinery process unit (150) is a fluid catalytic cracking (FCC) unit. In another preferred embodiment the first refinery process unit is a steam cracking unit.

In an embodiment, at least a portion of the retentate product stream (140) obtained is sent as a first intermediate retentate stream (155) for further processing in a second refinery process unit (160) designed to upgrade the retentate product stream into one or more final or intermediate products. In a preferred embodiment, the second refinery process unit is an asphalt blending unit. In another preferred embodiment the second refinery process unit is a thermal coker unit. In a further embodiment, the thermal coker unit is a Fluid Coker, a Flexicoker, or delayed coker unit. In yet another preferred embodiment the second refinery process unit is a fuel oil blending unit.

In another embodiment, optionally, at least a portion of the retentate product stream (140) may be segregated as a recycled retentate stream (145) and combined with the heavy hydrocarbon stream (101) prior to contacting at least one membrane (115) in the membrane separations unit (110). The remainder of the retentate product (140) is sent for further processing or product blending. As noted prior, in embodiments wherein a portion recycled retentate product is combined with the heavy hydrocarbon stream this combination may occur prior to entering the membrane separations unit or this combination may occur within one of the retentate zones of the membrane separations unit.

In another preferred embodiment, the heavy hydrocarbon stream (101) is comprised of a crude vacuum distillation resid (or "vacuum resid"). In a more preferred embodiment, the heavy hydrocarbon stream (101) is comprised of at least 50 wt % crude vacuum distillation resid. Even more preferably, in an embodiment, the heavy hydrocarbon stream (101) is comprised of at least 75 wt % crude vacuum distillation resid.

Figure 3:
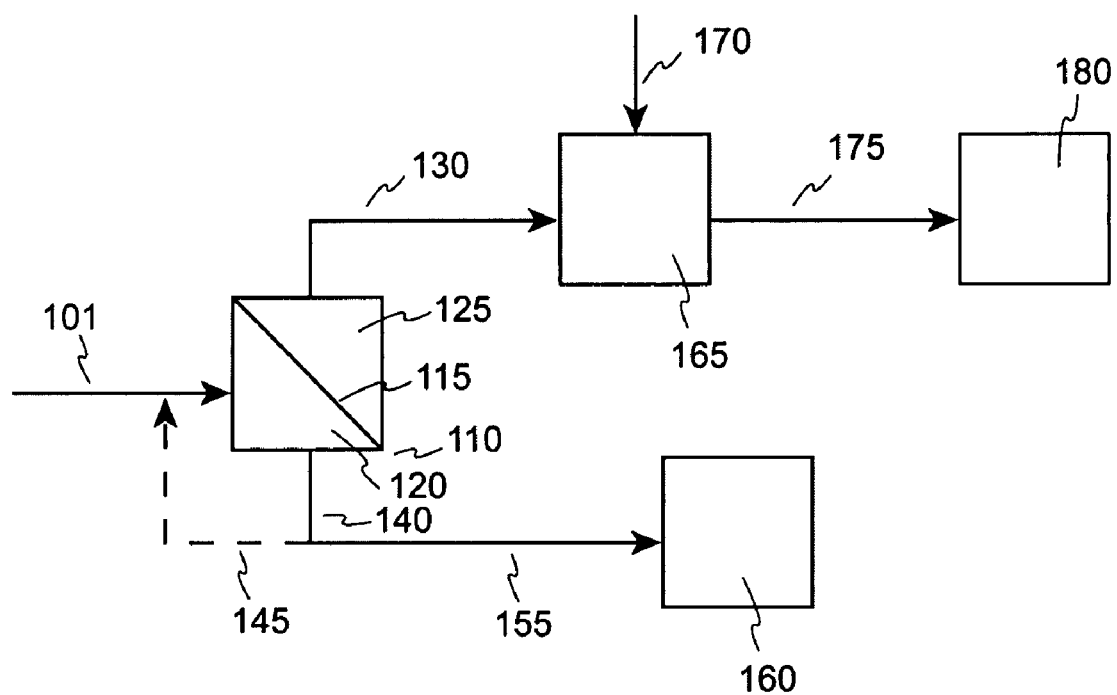
FIG. 3 illustrates one embodiment of the ultrafiltration process of the present invention wherein a heavy hydrocarbon feedstream is separated into at least one permeate product stream and at least one retentate product stream and at least a portion of the permeate product stream is hydrotreated or hydrocracked in the presence of a catalyst and hydrogen prior to further processing in a refinery/petrochemical process unit and at wherein at least a portion of the retentate product stream is further processed in a refinery/petrochemical process unit. Alternatively, at least a portion of the retentate product stream may also be recycled and combined with the heavy hydrocarbon stream prior to the combined stream contacting membrane module.

FIG. 3 illustrates yet another embodiment of the present invention wherein at least a portion of the permeate stream is hydrotreated prior to being further processed in a first refinery process unit. Elements (101) through (145) and (155) through (160) have similar characteristics and perform similar functions to the corresponding element numbers described above in the embodiment illustrated by FIG. 2. However, in the embodiment illustrated in FIG. 3, at least a portion of the permeate product stream (130) is processed in a hydrotreating unit (165) prior to be being further processed in a first refinery process unit (180). In a preferred embodiment, the first refinery process unit (180) is a fluid catalytic cracking (FCC) unit. In another preferred embodiment the first refinery process unit is a solvent deasphalting unit. In yet another preferred embodiment the first refinery process unit is a steam cracking unit.

The hydrotreating unit (165) contains a hydrotreating catalyst and at least a portion of permeate product stream (130) is contacted with the hydrotreating catalyst in the presence of a hydrogen containing gaseous stream (170). A hydrotreated product stream (175) is produced and at least a portion of the hydrotreated product stream is further processed in the first refinery process unit (150). The hydrotreating unit (165) has capabilities for hydrodesulfurization and/or hydrocracking of the permeate product stream. The hydrotreating unit may contain a fixed bed hydrotreating reactor, and/or a slurry bed hydrotreating reactor, such as, but not limited to, an H-Oil unit which utilizes a slurry bed reactor.

The hydrotreating step in this embodiment of the present invention improves the saturate content of the permeate product stream obtained and may also reduce the average molecular weight of the hydrocarbon stream in the product obtained. The improved saturates content improves the quality of the permeate product stream for use as a feed to a fluid catalytic cracking unit (FCC) by providing higher hydrogen content feed material which tends to produce less coke make and higher naptha and distillate boiling range product conversion. This highly saturated hydrotreated product stream also improves the product qualities when the stream is further processed into a lube oil or is steam cracked for olefin production.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the improved product qualities and the benefits from specific embodiments of the current invention for producing an improved product stream from a heavy hydrocarbon containing feedstream via ultrafiltration with the membranes and operating conditions of the present invention. These Examples only illustrate specific embodiments of the present invention and are not meant to limit the scope of the current invention.

EXAMPLES

In Examples 1 through 4 below, all of the experiments were run utilizing a pilot plant as shown in simplified form in FIG. 4. The fresh heavy hydrocarbon feed (201) utilized in the Examples was a commercial crude vacuum distillation resid product (or "vacuum resid") and was fed into the membrane separations unit (210) by a feed pump (205) wherein the fresh feed rate was measured with a flow meter (215). A portion of the retentate stream (220) obtained from the membrane separations unit was recycled through the recycle pump (225) and the flow rate was measured via a flow meter (230) prior to combining with the fresh feed (201). The combined feedstream was sent through a heat exchanger (235) to maintain the feedstream at a desired temperature set point prior to introduction into the membrane separations unit (210) containing the membrane module(s) (212). The pressure drop across the retenate zone was measured via pressure indicators (240) and (245). The transmembrane pressure was measured via pressure indicators (240) and (250). The permeate flow rate was measured by a flow meter (255) and the permeate product (260) and the remaining retentate product (265) were collected.

A commercial grade vacuum resid (i.e., vacuum distillation column bottoms) was used as the fresh feed for these experiments. The membrane separations unit as utilized in Examples 1, 2, and 3 was composed of two 40"(1.016 m) length tubular porous membrane modules placed in a series flow configuration in the membrane separations unit. Each membrane module had an approximate internal diameter of 0.72" (18.29 mm) and an approximate 25" (0.635 m) porous length. The total porous area for the two modules was approximately 0.785 ft$^2$ (0.073 m$^2$). The membrane separations unit as utilized in Example 4 was composed of one tubular porous membrane with an approximate internal diameter of 0.72" (18.29 mm) and an approximate 60" (1.52 m) porous length. All membrane modules were made of sintered stainless steel metal with a titanium oxide ceramic layer.

The internal ceramic layer of the membrane modules for Examples 1, 2, and 3 had a nominal pore size of about 0.1 micrometers (μm) and the membrane modules had a membrane bubble point maximum pore size of about 1.84 μm. The internal ceramic layer of the membrane modules for Example 4 had a nominal pore size of about 0.02 micrometers (μm) and the membrane modules had a membrane bubble point maximum pore size of about 2.97 μm. The membrane bubble point maximum pore sizes of the membrane modules were measured in accordance with ASTM Method F316 "Standard Test Methods for Pore Size Characteristics of Membrane Filters by Bubble Point and Mean Flow Pore Test" utilizing methanol as a test fluid.

It should be noted that the setpoints and process data points shown in the Examples below are those achieved after the pilot plant achieved steady state operation.

Example 1

In this Example, the transmembrane pressure control setpoint was 400 psi (similar to Examples 2, 3, and 4). The combined feedstream temperature setpoint was 260° C. (similar to Examples 2 and 4). The fresh feed pump steady state flow rate was approximately 5.74 grams/min and the recycle pump steady state flow rate setpoint was approximately 15,235 grams/min. The ratio of the recycle flow rate to the fresh feed flow rate was approximately 2,654. This created a calculated crossflow velocity through the membrane modules of about 3.2 ft/s (0.98 m/s). The pilot plant unit was lined out to achieve a steady state operation to generate 50% permeate yield based on the fresh feed rate. After achieving steady state operation, a pair of permeate and retentate samples were collected for 17 hours and 50 minutes and analyzed.

The process conditions, flux rates, and selectivity results from this Example are shown as Example 1 in Table 1. The analytical test results from this Example are shown as Example 1 in Table 2. The viscosity of the Fresh Feed, as well as the Permeate and Retentates obtained from Examples 1 through 3 were analyzed and are also shown in Table 3.

Example 2

In this Example, the transmembrane pressure control setpoint was 400 psi (similar to Examples 1, 3, and 4). The combined feedstream temperature setpoint was 260° C. (similar to Examples 1 and 4). The fresh feed pump steady state flow rate was approximately 15.96 grams/min and the recycle pump steady state flow rate setpoint was approximately 72,097 grams/min. The ratio of the recycle flow rate to the fresh feed flow rate was approximately 4,517. This created a calculated crossflow velocity through the membrane modules of about 15.0 ft/s (4.6 m/s). The pilot plant unit was lined out to achieve a steady state operation to generate 50% permeate yield based on the fresh feed rate. After achieving steady state operation, a pair of permeate and retentate samples were collected for 16 hours and 25 minutes and analyzed.

The process conditions, flux rates, and selectivity results from this Example are shown as Example 2 in Table 1. The analytical test results from this Example are shown as Example 2 in Table 2. The viscosity of the Fresh Feed, as well as the Permeate and Retentates obtained from Examples 1 through 3 were analyzed and are also shown in Table 3.

Example 3

In this Example, the transmembrane pressure control setpoint was 400 psi (similar to Examples 1, 2, and 4). The combined feedstream temperature setpoint was raised to 290° C. The fresh feed pump steady state flow rate was approximately 31.44 grams/min and the recycle pump steady state flow rate setpoint was approximately 72,097 grams/min. The ratio of the recycle flow rate to the fresh feed flow rate was approximately 2,293. This created a calculated crossflow velocity through the membrane modules of about 15.0 ft/s (4.6 m/s). The pilot plant unit was lined out to achieve a steady state operation to generate 50% permeate yield based on the fresh feed rate. After achieving steady state operation, a pair of permeate and retentate samples were collected for 6 hours and 47 minutes and analyzed.

The process conditions, flux rates, and selectivity results from this Example are shown as Example 3 in Table 1. The analytical test results from this Example are shown as Example 3 in Table 2. The viscosity of the Fresh Feed, as well as the Permeate and Retentates obtained from Examples 1 through 3 were analyzed and are also shown in Table 3.

As can be seen in Table 3, the absolute viscosities (in units cP@250° F.) of the permeates obtained from these embodiments of the present invention are significantly reduced in comparison to the absolute viscosities of the heavy hydrocarbon feedstream (in units cP@250° F.). In an embodiment of the present invention, the absolute viscosity$_{@250°\ F.}$ of the permeate product stream is less than about 75% of the absolute viscosity$_{@250°\ F.}$ of the heavy hydrocarbon feedstream. In another embodiment, the absolute viscosity$_{@250°\ F.}$ of the permeate product stream viscosity is less than about 50% of the absolute viscosity$_{@250°\ F.}$ of the heavy hydrocarbon feedstream.

Example 4

In this Example, the transmembrane pressure control setpoint was 400 psi (similar to Examples 1, 2, and 3). The combined feedstream temperature setpoint was 260° C. (similar to Examples 1 and 2). The fresh feed pump steady state flow rate was approximately 20.00 grams/min and the recycle pump steady state flow rate setpoint was approximately 72,097 grams/min. The ratio of the recycle flow rate to the fresh feed flow rate was approximately 3,604. This created a calculated crossflow velocity through the membrane modules of about 14.8 ft/s (4.5 m/s). The pilot plant unit was lined out to achieve a steady state operation to generate 50% permeate yield based on the fresh feed rate. After achieving steady state operation, a pair of permeate and retentate samples were collected for 6 hours and 47 minutes and analyzed.

The process conditions, flux rates, and selectivity results from this Example are shown as Example 4 in Table 1. The analytical test results from this Example are shown as Example 4 in Table 2. The viscosity of the Fresh Feed, as well as the Permeate and Retentates obtained from Examples 1 through 3 were analyzed and are also shown in Table 3.

TABLE 1

Process Conditions, Flux, and Selectivity Results

| Parameter | Example 1 | Example 2 | Example 3 | Example 4 |
|---|---|---|---|---|
| Temperature (° C.) | 259.7 | 260.2 | 290.4 | 260.4 |
| Transmembrane Pressure (psi) | 403 | 402 | 405 | 397 |
| Cross Flow Velocity (ft/s) | 3.2 | 15.0 | 15.0 | 14.8 |
| Reynolds Number | 1417 | 6485 | 9807 | 6453 |
| Permeate Yield (based on wt % of fresh feed) | 49.2 | 50.3 | 50.0 | 50.0 |
| Permeate Flux (gal/ft2/day) | 1.56 | 4.35 | 8.64 | 4.51 |
| Membrane Bubble Point Maximum Pore Size (μm) | 1.84 | 1.84 | 1.84 | 2.97 |
| Nominal Pore Size (μm) | 0.1 | 0.1 | 0.1 | 0.02 |
| MCR % Rejection (based on wt %) | 28.0 | 28.0 | 24.4 | 24.4 |
| Nickel % Rejection (based on wt %) | 45.2 | 44.8 | 46.4 | 47.3 |
| Vanadium % Rejection (based on wt %) | 41.9 | 40.8 | 40.1 | 41.5 |

TABLE 2

Analytical Test Results

| Property | Fresh Feed | Example 1 Permeate | Example 1 Retentate | Example 2 Permeate | Example 2 Retentate | Example 3 Permeate | Example 3 Retentate | Example 4 Permeate | Example 4 Retentate |
|---|---|---|---|---|---|---|---|---|---|
| Micro Carbon Residue (MCR) (wt %) | 16.4 | 11.8 | 19.8 | 11.8 | 20.0 | 12.4 | 20.3 | 12.4 | 19.9 |
| Density @ 60° F. (g/ml) | 1.00 | 0.99 | 1.02 | 0.99 | 1.02 | 0.99 | 1.02 | 0.98 | 1.01 |
| API Gravity | 9.8 | 11.4 | 7.1 | 11.2 | 6.7 | 12.0 | 7.9 | 12.2 | 8.1 |
| Sulfur (wt %) | 1.97 | 1.93 | 2.09 | 1.92 | 2.07 | 1.93 | 2.10 | 1.91 | 2.07 |
| Nickel (ppm) | 39.7 | 21.8 | 55.0 | 21.9 | 58.1 | 21.3 | 55.6 | 20.9 | 56.0 |
| Iron (ppm) | 11.5 | 8.3 | 23.4 | 2.3 | 32.7 | 1.6 | 32.9 | 1.5 | 23.4 |
| Vanadium (ppm) | 112.7 | 65.5 | 151.9 | 66.7 | 157.9 | 67.6 | 150.4 | 65.9 | 152.7 |

TABLE 3

Analytical Test Results - Viscosities

| Temperature (° F./° C.) | Fresh Feed (Viscosity, cP) | Example 1 (Viscosity, cP) Permeate | Example 1 (Viscosity, cP) Retentate | Example 2 (Viscosity, cP) Permeate | Example 2 (Viscosity, cP) Retentate | Example 3 (Viscosity, cP) Permeate | Example 3 (Viscosity, cP) Retentate |
|---|---|---|---|---|---|---|---|
| 250° F./121° C. | 264 | 106 | 824 | 115 | 1082 | 118 | 886 |
| 300° F./149° C. | 81 | 38 | 201 | 41 | 251 | 42 | 215 |
| 350° F./177° C. | 33 | 19 | 71 | 18 | 84 | 18 | 76 |
| 400° F./204° C. | 16 | 10 | 32 | 10 | 37 | 10 | 34 |
| 450° F./232° C. | 9 | 6 | 17 | 6 | 19 | 6 | 18 |

These examples illustrate the improved process of the present invention. Further explanation as to the significance of the information provided from these Examples is provided in the Detailed Description above.

What is claimed is:

1. A process for separating a heavy hydrocarbon stream, comprising:
   a) contacting the heavy hydrocarbon stream having a final point of at least 1100° F., with at least one porous membrane element in a membrane separation zone wherein the heavy hydrocarbon feedstream contacts a first side of the porous membrane element;
   b) retrieving at least one permeate product stream from a second side of the porous membrane element, wherein the permeate product stream is comprised of selective materials which pass through the porous membrane element from the first side of the porous membrane element and are retrieved in the permeate product stream from the second side of the porous membrane element;
   c) retrieving at least one retentate product stream from the first side of the porous membrane element;
   d) conducting at least a portion of the permeate product stream to a first refinery process unit selected from a fluid catalytic cracking (FCC) unit and a steam cracking unit; and
   e) conducting at least a portion of the retentate product stream to a second refinery process unit;
   wherein the CCR % Rejection based on the permeate product stream and the heavy hydrocarbon stream is at least 10%.

2. The process of claim 1, wherein the porous membrane element is comprised of a material selected from ceramics, metals, glasses, polymers, and combinations thereof.

3. The process of claim 2, wherein the porous membrane element has an average pore size of about 0.001 to about 2 microns.

4. The process of claim 3, wherein the second refinery process unit is an asphalt blending unit, a thermal coker unit, or a fuel oil blending unit.

5. The process of claim 4, wherein the Reynolds number of the stream on the first side of the porous membrane element is at least about 2000.

6. The process of claim 5, wherein the Nickel % Rejection of the permeate product stream is at least 25% and the Vanadium % Rejection of the permeate product stream is at least 25%.

7. The process of claim 6, wherein the transmembrane pressure across the porous membrane element is at least 400 psig.

8. The process of claim 7, wherein at least a portion of the retentate product stream is combined with the heavy hydrocarbon stream prior to contacting the porous membrane element.

9. The process of claim 7, wherein the absolute viscosity$_{@250\ °F}$ of the permeate product stream is less than about 75% of the absolute viscosity$_{@250\ °F}$ of the heavy hydrocarbon feedstream.

10. The process of claim 9, wherein the heavy hydrocarbon stream is comprised of at least 50 wt% crude vacuum distillation resid.

11. The process of claim 9, wherein the porous membrane element is comprised of a material selected from ceramics, metals, and combinations thereof.

12. The process of claim 11, wherein the heavy hydrocarbon stream temperature is from about 100 to about 350 ° C.

13. The process of claim 12, wherein the transmembrane pressure across the porous membrane element is at least 700 psig.

* * * * *